United States Patent Office 2,915,337
Patented Dec. 1, 1959

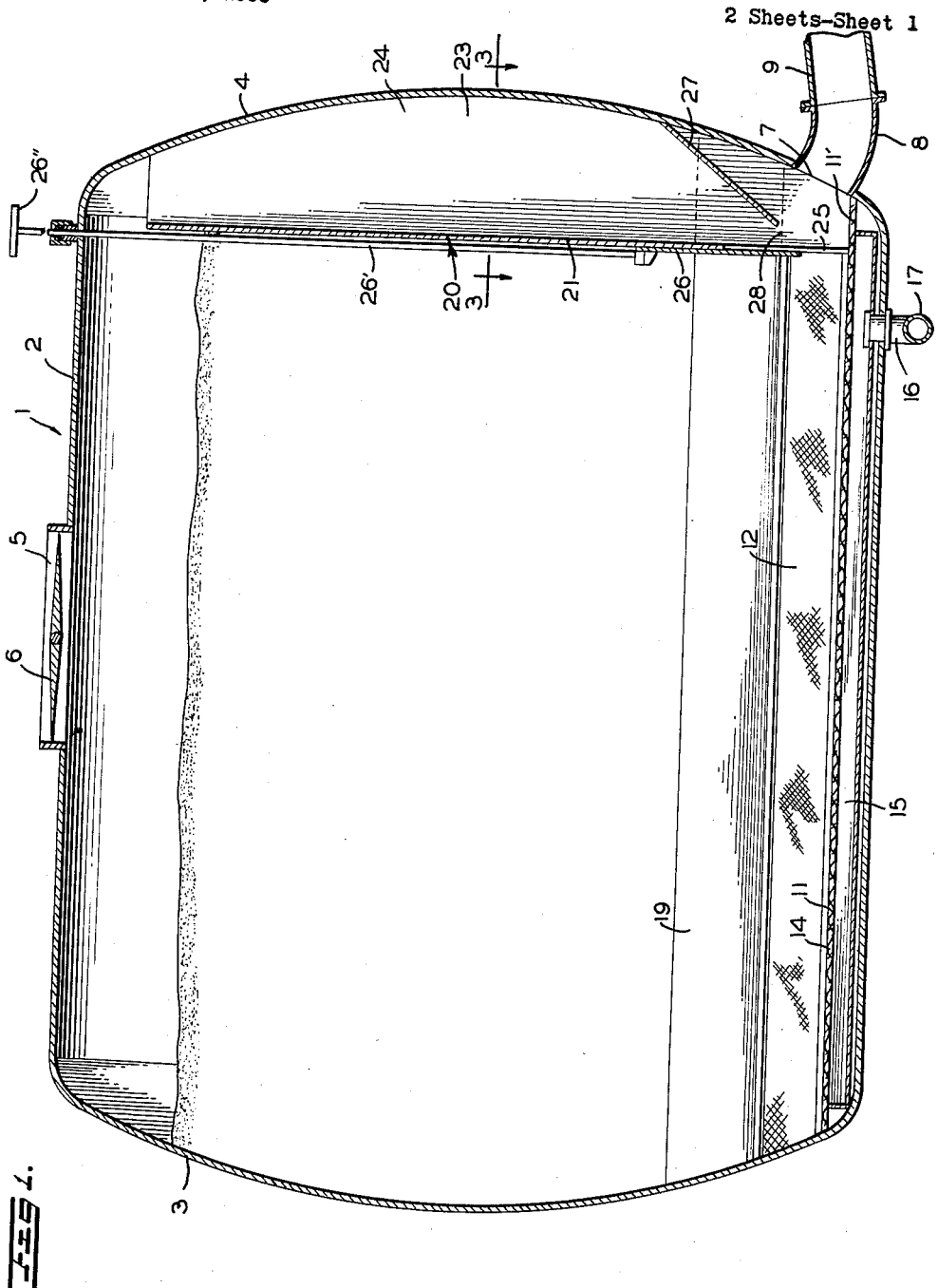

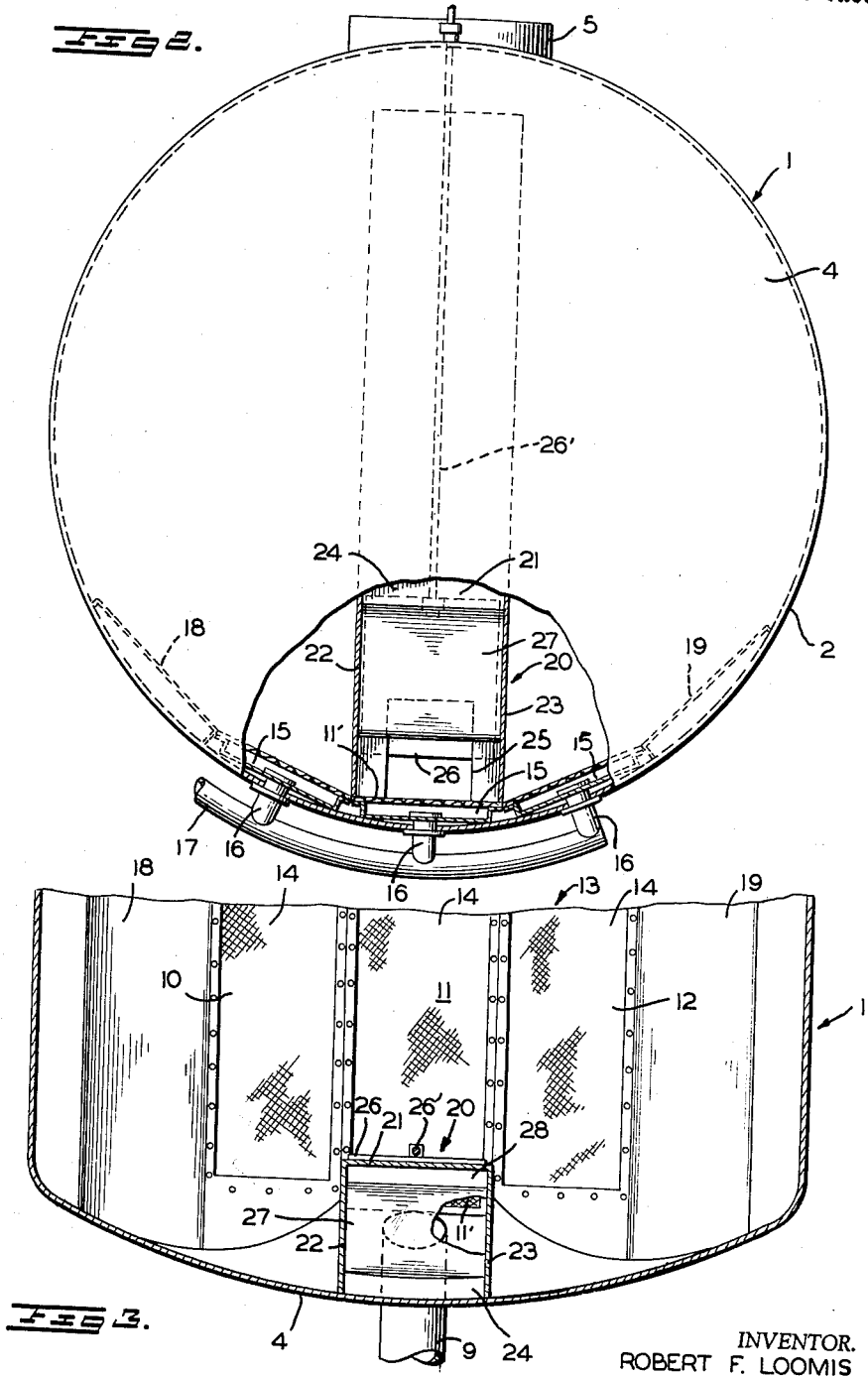

2,915,337

DISCHARGE MEANS FOR STORAGE RECEPTACLES

Robert F. Loomis, Allentown, Pa., assignor to Fuller Company, a corporation of Delaware Application December 23, 1958, Serial No. 782,434

15 Claims. (Cl. 302—53)

The present invention relates to the conveying of pulverulent material and particularly to a pressurized vessel in which such material may be stored and from which it subsequently may be discharged into a conveying conduit to be carried therethrough by a gas stream.

In my copending application Serial No. 678,798, filed August 19, 1957, now Patent No. 2,891,817, issued June 23, 1959, of which this application is a continuation-in-part, I have disclosed a pressurized vessel for the storage and subsequent discharge of material into a conveying conduit in which the gas for carrying the material through the conveying conduit is taken from the relatively low-pressure gas in the upper portion of the vessel. The vessel disclosed in that application is elongated in a horizontal direction and has a gas-permeable deck spaced a slight distance from the bottom of the vessel and inclined downwardly towards a discharge outlet at one end of the vessel which communicates with the conveying line. A baffle extends across the end of the vessel having the discharge outlet to hold back the main body of pulverulent material in the vessel. The baffle has an opening adjacent the gas-permeable deck and its upper side stops short of the top of the vessel to provide a passage for pressure gas from the upper part of the vessel into the space between the baffle and the adjacent end of the vessel. In operation, gas is introduced into the plenum chamber formed between the bottom of the vessel and the gas-permeable deck and passes upwardly through the deck and into the overlying material, fluidizing the same. The fluidizing material flows downwardly along the upper surface of the inclined deck and through the opening in the baffle to the discharge outlet and connected conveying conduit. Since the vessel is sealed, the gas which passes from the upper surface of the fluidized material builds up a pressure in the upper portion of the vessel and upon continued introduction of the gas, passes through the space above the baffle and downwardly through the space between the baffle and the end wall to the discharge outlet. This downwardly-flowing stream of gas flows over and entrains the material on the lower end of the deck which has passed through the opening in the baffle and carries it in suspension into and through the conveying conduit to the desired location.

In some instances, the material to be conveyed may have properties such as high density, low surface area per unit mass, high moisture, or other characteristics which cause it to resist entrainment or suspension in the downwardly-flowing gas stream, which generally results in erratic, inefficient conveying, and, possibly, stoppage of the system.

The present invention relates to an improved conveying system of the type disclosed in my foresaid application, which is particularly adapted for vessels for storing and discharging such problematical materials.

More particularly, the preferred form of vessel of the present invention has a gas-permeable deck sloping downwardly towards a discharge outlet in its lower region, and a partition or baffle extends from the gas-permeable deck to the upper portion of the vessel and encloses the discharge outlet. The upper portion of this baffle is in free communication with the space in the main portion of the vessel so that the baffle forms at least a part of a gas conduit extending from the upper portion of the vessel to the discharge outlet. At its lower end, the gas conduit is provided with a passage or aperture adjacent the deck forming a space for the flow of material from the deck toward the discharge outlet. Thus, the baffle functions to limit the amount of material which may flow from the deck toward the discharge outlet in a manner similar to the baffle of my aforesaid application. The gas conduit preferably includes adjustable means at its aperture for controlling the amount of pulverulent material which may flow therethrough toward the discharge outlet.

A deflecting baffle is positioned across the interior of the gas conduit, in the region of the aperture, in converging relationship with the wall of the conduit in which the aperture is formed. The deflecting baffle terminates short of the aperture to form a restricted area for the flow of gas in a path intersecting the fluidized material as it emerges from the aperture.

Gas passing upwardly through the gas-permeable deck fluidizes the pulverulent material and causes it to flow along the deck to the aperture in the gas conduit. After passing through the body of fluidized pulverulent material, the gas builds up a gas pressure in the upper part of the vessel. This pressure gas flows downwardly through the gas conduit to entrain material passing through the aperture and carry it in suspension through the discharge outlet, similar to the operation of my foresaid application. However, as the flowing gas stream in the conduit approaches the region of the aperture, the deflecting baffle by decreasing the space through which the gas stream flows increases its velocity and causes it to be directed toward the point of emergence of material from the aperture.

A better understanding of the invention may be derived from the accompanying drawings and description in which—

Fig. 1 is a sectional view of a vessel embodying the invention;

Fig. 2 is an end view, partly cut away of the vessel of Fig. 1; and

Fig. 3 is a partial sectional view taken along the lines 3—3 of Fig. 1.

As shown in the figures, a vessel 1 comprising a cylindrical wall 2 and end walls 3 and 4 is provided with a material inlet 5 having a valve 6 therein. The vessel has a discharge outlet 7 in the lower region of the end wall 4. The discharge outlet 7 is fitted with an outlet member 8 for connection of a suitable conveying line 9. A plurality of fluidizing conveyor sections 10, 11 and 12 are arranged to form a composite gas-permeable deck 13 in the lower region of the vessel which extends to a position adjacent the discharge outlet 7. The fluidizing conveyor sections 10 and 12 slope transversely of the vessel and their lower edges abut the respective edges of the center section 11. Each of the sections 10, 11 and 12 comprise a gas-permeable medium 14 secured over a plenum chamber 15 served by an air inlet 16 which leads externally of the vessel to an air supply manifold 17 connected to a source of gas under pressure, not shown. A pair of slope sheets 18 and 19 extend outwardly and upwardly from the outer edges of the conveying sections 10 and 12, respectively, to join the cylindrical wall. The gas-permeable medium may be formed of woven fabric, porous stone, porous metal or any other material having the desired gas-permeability.

Where total cleanout of material is desired, the fluidizing conveyor sections may be arranged, in any convenient manner, to slope downwardly toward the outlet.

Adjacent and spaced from the end wall 4, a partition or baffle 20 of generally U-shaped cross-section extends upwardly from the center fluidizing conveyor section 11 to the upper region of the vessel. The baffle 20 comprises a wall 21 extending transversely of the vessel and of the conveyor section 11, and a pair of contiguous side walls 22 and 23 which extend upwardly from the edges of the conveyor section 11 and bridge the space between the wall 21 and end wall 4, to form a generally rectangular gas conduit 24 which encloses the discharge outlet and acts as a barrier to retain the bulk of the material in the vessel. The wall 21 has an aperture 25 adjacent the conveyor section 11. A controlled valve 26 regulates the flow of fluidized material through the aperture toward the discharge outlet. An operating rod 26' for the valve 26 is conected at its lower end to the valve and extends upwardly through the vessel to the outside where it has a handle 26" to permit external operation of the valve. The discharge end 11' of the center gas-permeable deck section 11 and the underlying plenum chamber extends beyond the baffle to a position where it will be impinged upon by the gas stream flowing downwardly through the gas conduit 24.

Within the gas conduit 24, a sloping, deflecting baffle 27 is secured between the walls 22 and 23 and is joined thereto along its lateral edges. The deflecting baffle 27 is joined at its upper edge with the end wall 4, and extends downwardly therefrom along a plane which intersects the aperture 25, terminating short of the wall 21 to form a restricted opening 28 therewith and with portions of the side walls 22 and 23. The opening 28 preferably has an area approximately equal to the internal cross-sectional area of the conveying line 9. The space between the underside of the deflecting baffle 27 and the end wall 4 is left open to provide an open space in which gas passing through the restricted space between the lower end of the baffle and the wall 21 may expand, thereby causing a deceleration and high turbulence of the air-material mixture just prior to passing through the discharge outlet to the outlet member 8.

In operation, the vessel is filled with pulverulent material to a level slightly below the upper end of the gas conduit 24, and the valve 6 is closed. Gas or air under pressure from a source (not shown) is delivered through the manifold 17 and inlets 16 to the fluidizing conveyor sections 10, 11 and 12, and passes upwardly through the material to cause a fluidization thereof. Upon leaving the upper surface of the fluidized material, the air accumulates in the upper portion of the vessel and passes over the upper end of the gas conduit 24 and flows downwardly therethrough to the discharge outlet 7.

The valve 26 is now opened to permit passage of fluidized material through the aperture 25 into the protruding discharge end of the center gas-permeable deck section 11. The gas stream flowing downwardly through the gas conduit is constricted, by the convergence of the deflecting baffle 27 with the wall 21, and is directed inwardly through the opening 28 towards the aperture and downwardly towards the protruding end of the gas-permeable deck section 11 at an increased velocity and in a rectangular flow path. Therefore, as material emerges through the aperture 25 and passes into the protruding end of the gas-permeable deck section, the constricted gas stream impinges thereon in a direction slightly opposite the ultimate direction of flow, causing a high degree of turbulence which forcibly agitates the material and thereby facilitates its entrainment in the gas stream. The entrainment of the material in flowing gas stream in further facilitated by the fact that it continues to be maintained in a fluidized state after passing through the aperture 25 by the gas passing upwardly through the protruding end 11' of the center gas-permeable deck section 11. The turbulent condition of the air-material mixture is augmented by the expansion of the air as it passes below the abrupt lower edge of the deflecting baffle 27 into the space betwen the end wall 4 and the divergent surfaces of the protruding end 11' of the gas-permeable deck and the underside of the deflecting baffle, by the eddying effect caused thereby and also by the sudden transition from a generally rectangular space to the confined, substantially circular outlet.

Therefore, the gas attains conveying velocity while passing through the opening 28, decelerates during impingement on the material and again accelerates to conveying velocities upon entering the outlet 7 and outlet member 8. Hence, the pulverulent material is thoroughly and evenly dispersed and entrained in the gas stream entering the conveying line, preventing erratic conveying or plugging in the system.

Various changes may be made in the details of construction without departing from the scope of the invention or sacrificing any of the advantages thereof.

I claim:

1. Apparatus for discharging pulverulent material comprising a vessel having a material inlet and a discharge outlet, a gas-permeable deck in the lower region of the vessel, means for passing a gas under pressure upwardly through the gas-permeable deck to fluidize material thereabove, the discharge outlet forming the exit for material and gas from the vessel, a gas conduit in the vessel communicating with the upper portion of the vessel and at its lower end enclosing and separating the discharge outlet from the main portion of the vessel to convey gas downwardly therethrough to a location within the vessel adjacent the discharge outlet, the gas conduit having an aperture at one side thereof in its lower region located to permit flow of material fluidized on said gas-permeable deck into the lower end of the conduit and towards said discharge outlet, and means for accelerating the gas stream passing downwardly through the gas conduit and directing it towards the aperture, whereby fluidizing gas separating from the fluidized material passes to the upper portion of the vessel and from there, passes as a flowing stream, downwardly through the gas conduit to impinge upon and entrain the material passing through said aperture and to carry it in suspension through the discharge outlet.

2. Apparatus as set forth in claim 1 in which the wall of the gas conduit opposite the aperture converges toward said aperture.

3. Apparatus as set forth in claim 1 including means for decelerating the gas-material mixture between said aperture and said discharge outlet.

4. Apparatus as set forth in claim 3 in which the gas conduit diverges from adjacent the aperture toward said discharge outlet.

5. Apparatus for discharging pulverulent material comprising a vessel having a material inlet and a discharge outlet, a gas-permeable deck in the lower region of the vessel, means for passing a gas under pressure upwardly through the gas-permeable deck to fluidize material thereabove, the discharge outlet forming the exit for material and gas from the vessel, a baffle within the vessel and separating the discharge outlet from the main portion of the vessel, said baffle at least in part forming an aperture for the flow of fluidized material from the main portion of the vessel toward the discharge outlet, the baffle also at least in part forming a gas conduit for conducting fluidizing gas separating from the fluidized material and collecting in the upper portion of the vessel downwardly toward the discharge outlet, and a deflecting baffle in the lower portion of the gas conduit, adjacent the discharge outlet, said baffle being inclined downwardly and towards said aperture to cause the passage through the gas conduit to be restricted adjacent said aperture.

6. Apparatus as set forth in claim 5 in which the gas conduit diverges from the lower end of the deflecting baffle toward the discharge outlet.

7. Apparatus as set forth in claim 5 in which the aperture is positioned in the baffle opposite and substantially aligned with the discharge outlet, and the deflecting baffle at least in part forms a divergent portion in the gas conduit between the aperture and the discharge outlet.

8. Apparatus as set forth in claim 1 in which at least a portion of the gas-permeable deck and the means for passing gas therethrough extends beyond the baffle to a position where the gas-permeable deck will be impinged upon by the gas stream flowing downwardly through said gas conduit.

9. Apparatus for discharging pulverulent material comprising a vessel having a material inlet and a discharge outlet, a gas-permeable deck in the lower region of the vessel, means for passing a gas under pressure upwardly through the gas-permeable deck to fluidize overlying material, the discharge outlet forming the exit for material and gas from the vessel, a baffle in the vessel comprising a first wall and a pair of side walls extending therefrom, the first wall and the side walls forming a part of a gas conduit in the vessel communicating, at its upper end, with the upper portion of the vessel and, at its lower end, enclosing and separating the discharge outlet from the main portion of the vessel to convey gas downwardly therethrough to the discharge outlet, said first wall having an aperture in its lower region to permit flow of material fluidized on the gas-permeable deck from the main portion of the vessel into the lower end of the conduit and toward said discharge outlet, whereby fluidizing gas separating from the fluidized material passes to the upper portion of the vessel and from there, as a flowing stream, downwardly through the gas conduit to impinge upon and entrain the material passing through said aperture and to carry it in suspension through the discharge outlet.

10. Apparatus as set forth in claim 9 in which the gas conduit is of substantially the same cross-sectional shape throughout substantially its entire length.

11. Apparatus as set forth in claim 9 in which the discharge outlet is located in one of the side walls of the vessel, and in which the side walls of the baffle join said side wall of the vessel along their edges remote from said first wall, whereby said side wall forms a portion of the gas conduit.

12. Apparatus as set forth in claim 9 in which said first wall extends upwardly from the surface of the gas-permeable deck and the aperture in said first wall is opposite and aligned with the discharge outlet.

13. Apparatus as set forth in claim 9 including means for accelerating the gas stream passing downwardly through the gas conduit.

14. Apparatus as set forth in claim 13 in which the lower portion of the gas conduit opposite the wall having the aperture converges towards said aperture.

15. Apparatus as set forth in claim 13 including means for decelerating the gas-material mixture between said aperture and said discharge outlet.

References Cited in the file of this patent

UNITED STATES PATENTS

| | | |
|---|---|---|
| 2,032,367 | Kennedy | Mar. 3, 1936 |
| 2,538,235 | Coffey | Jan. 16, 1951 |
| 2,565,835 | Adams | Aug. 28, 1951 |
| 2,697,653 | Nicholson | Dec. 21, 1954 |
| 2,734,782 | Galle | Feb. 14, 1956 |

FOREIGN PATENTS

| | | |
|---|---|---|
| 751,162 | Great Britain | June 27, 1956 |